Jan. 26, 1937. H. J. HORN Re. 20,258

VEHICLE WHEEL

Original Filed Aug. 23, 1935

INVENTOR.
HARRY J. HORN

BY Carroll R. Taber

ATTORNEY.

Reissued Jan. 26, 1937

Re. 20,258

UNITED STATES PATENT OFFICE 20,258

VEHICLE WHEEL

Harry J. Horn, Lansing, Mich., assignor to Motor Wheel Corporation, Lansing, Mich., a corporation of Michigan Original No. 2,037,237, dated April 14, 1936, Serial No. 37,561, August 23, 1935. Application for reissue June 22, 1936, Serial No. 86,588

14 Claims. (Cl. 301—108)

This invention relates to vehicle wheels and has to do with a novel means for attaching a hub cap to a wheel of the type wherein a wheel body is secured to a hub by a plurality of stud bolt assemblies. In its preferred form the invention comprises a wire having a base portion bent for cooperative engagement with the outer portion of one of the stud bolt assemblies and resilient end portions adapted for detachable engagement with a hub cap. In another form the invention comprises a wire bent to engage two adjacent stud bolt assemblies and having extensions adjacent each of the stud bolts adapted for detachable engagement with a hub cap.

Both of the above mentioned forms of the invention are illustrated in the accompanying drawing, wherein.

Figure 1:
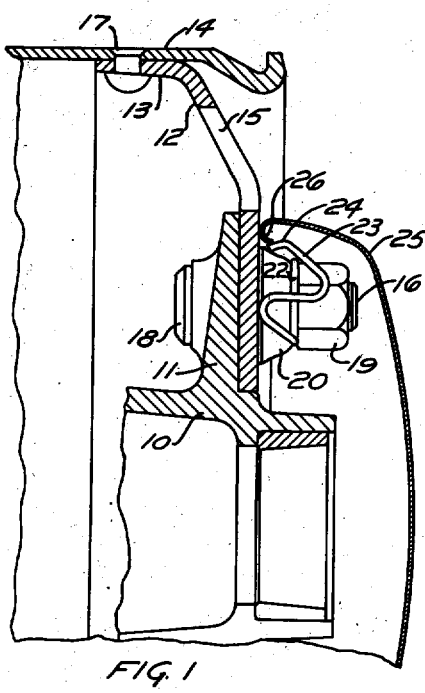
Figure 1 is a partial sectional view of a wheel having a hub cap secured thereto, taken on substantially the line 1—1 of Figure 2.
Figure 2:
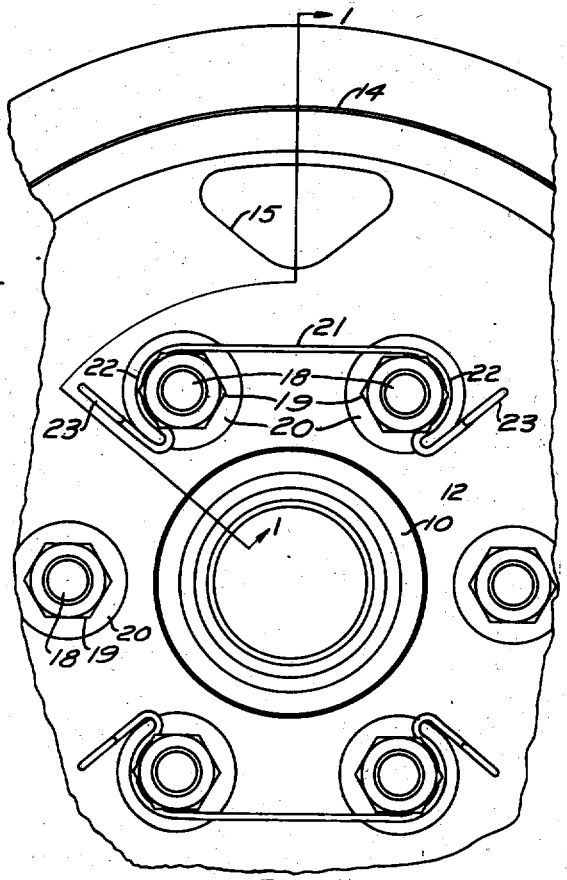
Figure 2 is a partial front view in elevation of the wheel shown in Figure 1 with the hub cap removed.

The wheel shown in Figures 1 and 2 includes a hub 10, having a hub flange 11, a wheel body 12 having a peripheral rim seat 13, and a rim 14 of the type conventionally used on trucks. The wheel body 12 is of the perforated disk type being provided with a plurality of openings 15. It is attached to the hub flange 11 in a conventional manner by means of a plurality of stud bolt assemblies 16. The rim 14 is attached to rim seat 13 in a conventional manner as by rivets 17.

The stud bolt assemblies consist of a stud bolt 18 secured in openings in hub flange 11, a nut 19 and a cup washer 20. The outer extremity of the stud bolt is threaded to receive the nut. The nut and cup washer are preferably swivelley connected to form a nut and cup washer assembly. The cup washer has a flaring skirt and forms with the nut at the corners thereof a plurality of retaining notches.

These retaining notches are made use of according to the present invention in detachably connecting a hub cap attaching clip to the stud bolt assemblies. As shown in Figures 1 and 2 a wire attaching clip 21 is provided having base portions 22 formed to engage the retention notches between the nut and washer of a pair of adjacent stud bolt assemblies. The opposite extremities of the clip are bent back upon themselves and otherwise deformed to provide the resilient extensions 23. Adjacent the free extremities of extensions 22 there is provided a hump 24.

The clips 21 are formed of wire of sufficient flexibility to permit the base portions 22 to be sprung into interlocking engagement with the stud bolt assemblies as shown in Figures 1 and 2. The clips are held in position on these assemblies solely by means of the resilient engagement of the assemblies by the clips. Preferably two clips 21 are used as shown. There are thus provided four extensions 23 to engage a hub cap.

As clearly shown in Figure 1, a hub cap 25 having an inturned peripheral engaging portion 26 is detachably connected to the wheel by the interlocking engagement between extensions 23 of clips 21 and peripheral portion 26 of cap 25. Cap 25 is installed by pressing the same axially toward the hump 24 on extensions 23 of clips 21. Extensions 23 are sufficiently flexible to yield under the axial pressure of cap 25 and to permit edge portion 26 of the cap to pass over humps 24 on extensions 23. The hump of course springs back to the position shown in Figure 1 after edge 26 has passed over it thus firmly but detachably locking the hub cap in position. The cap 25 may be removed by forcing the edge 26 back over humps 24 with any suitable means.

Figure 3:
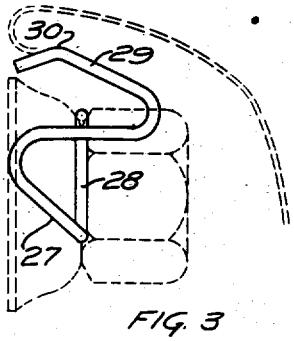
Figure 3 is a side view of a nut and cup washer such as shown in Figures 1 and 2 having a hub cap attaching clip attached thereto and showing in dotted lines the manner in which a hub cap is secured to the attaching clip.
Figure 4:
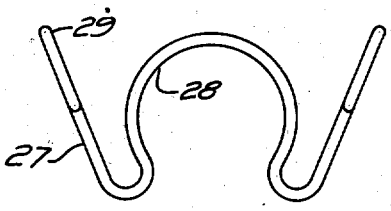
Figure 4 is a front view of the hub cap attaching clip shown in Figure 3.

A modified form of attaching clip is shown in Figures 3 and 4. As there shown the clip 27 is made of wire, has a base portion 28 and resilient extensions 29. In this form, however, the clip is adapted to be secured to but a single stud bolt assembly.

As in the case of clip 21, clip 27 is made of resilient wire and the base portion 28 is adapted to be pressed or sprung into interlocking engagement between the nut and cup washer forming a part of the stud bolt assembly. The extensions 29 are provided with humps 30 which are deflected to permit the edge portion of a hub cap to pass over them as shown in Figure 3. Where the nut and cup washer are swivelly connected to each other the clip 27 may be removed and installed with the nut and cup washer. Three or more clips 27 are required to satisfactorily attach a hub cap to a wheel.

One of the principal advantages of clips 21 and 27 is the ease with which they may be installed and removed. By making them of wire the cost of manufacture is very low. In the case of clip 27, it may be used with any size wheel without change. Thus, it is a universal form of fastening clip.

While only the preferred embodiments of the invention have been shown and described, it should be understood that various other embodiments may be employed within the scope of the invention as defined by the appended claims.

I claim:

1. In a wheel including a wheel body secured to a hub by stud bolt assemblies, a hub cap for the wheel and means for attaching the hub cap to the wheel comprising resilient attaching clips detachably connected to the stud bolt assemblies and presenting an engaging portion for cooperative engagement with the hub cap.

2. In a vehicle wheel, the combination with a stud bolt assembly utilized in attaching a wheel body to a hub of a hub cap attaching clip, said clip being of a configuration to be pressed into resilient engagement with said stud bolt assembly and to present a resilient engaging portion adapted for detachable engagement with a hub cap.

3. In a vehicle wheel, the combination with a stud bolt assembly of a wire hub cap attaching clip, said clip being of a configuration to be pressed into resilient engagement with the stud bolt assembly and to present a resilient engaging portion adapted for detachable engagement with a hub cap.

4. In a vehicle wheel. the combination with a stud bolt assembly including a nut threaded on a stud of a wire attaching clip having a base portion adapted to engage the assembly about the inner extremity of the nut and resilient extensions adapted for detachable engagement with a hub cap.

5. In a vehicle wheel, the combination with a stud bolt assembly including a nut and cup washer secured to a stud of a wire hub cap attaching clip having a base portion adapted to be pressed into resilient engagement with the stud bolt assembly between the nut and cup washer and having resilient extensions adapted for detachable engagement with a hub cap.

6. In a vehicle wheel, the combination with a stud bolt assembly and a hub cap of means for detachably connecting the two together comprising a resilient clip having portions adapted to be pressed into interlocking engagement with corresponding portions of the stud bolt assembly and hub cap respectively.

7. In a vehicle wheel, the combination with a nut and cup washer assembly of a wire hub cap attaching clip having a base portion adapted to be pressed into interlocking engagement with said assembly between portions of the nut and washer and having resilient extensions adapted for detachable engagement with a hub cap.

8. In a vehicle wheel, including a plurality of stud bolt assemblies utilized for attaching a wheel body to a hub, the combination with a pair of said assemblies of an attaching clip having a base portion adapted for resilient engagement with said pair of stud bolt assemblies and having resilient extensions adapted for detachable engagement with a hub cap.

9. In a vehicle wheel, including a wheel body secured to a hub by a plurality of stud bolt assemblies, means for attaching a hub cap to the wheel body to conceal the stud bolts comprising resilient attaching clips detachably connected to some of said stud bolt assemblies, said attaching clips having resilient extensions radially outwardly of the stud bolt assemblies adapted for detachable engagement with a hub cap.

10. In a vehicle wheel including two separate annular parts secured to each other by a plurality of circumferentially spaced bolt and nut assemblies, a cover for concealing all of said assemblies, and means for attaching the cover to the wheel comprising a wire attaching clip secured to one of said assemblies and having a resilient extension adapted for detachable engagement with the cover.

11. In a vehicle wheel including two separate annular parts secured to each other by a plurality of circumferentially spaced bolt and nut assemblies, a cover for concealing all of said assemblies, and means for attaching the cover to the wheel comprising a wire attaching clip, said clip being of a configuration to be pressed into resilient engagement with one of said bolt and nut assemblies and to present a resilient engaging portion for detachable engagement with the cover.

12. In a vehicle wheel including two separate annular parts secured to each other by a plurality of circumferentially spaced bolt and nut assemblies, a cover for concealing all of said assemblies, and means for attaching the cover to the wheel comprising an attaching clip secured to one of said assemblies and having a resilient extension adapted for detachable engagement with the cover.

13. In a vehicle wheel including two separate annular parts secured to each other by a plurality of circumferentially spaced bolt and nut assemblies, a cover for concealing all of said assemblies, and means for attaching the cover to the wheel comprising an attaching clip having a base portion adapted to be pressed into resilient engagement with one of the assemblies and a resilient extension adapted for detachable engagement with the cover.

14. In a wheel, the combination with two separate annular parts secured to each other by a plurality of circumferentially spaced bolt and nut assemblies, of a cover arranged to conceal all of said assemblies, and a plurality of resilient attaching clips secured to some of said assemblies and the cover to detachably connect the cover to the wheel, said attaching clips constituting the sole means for attaching the cover to the wheel.

HARRY J. HORN.